United States Patent
Agarwal et al.

(10) Patent No.: US 11,316,897 B2
(45) Date of Patent: Apr. 26, 2022

(54) APPLYING DEVICE POLICIES USING A MANAGEMENT TOKEN

(71) Applicant: VMWARE, INC., Palo Alto, CA (US)

(72) Inventors: Avinash Agarwal, Bangalore (IN); Sivasubramaniam Sivakumar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 535 days.

(21) Appl. No.: 15/666,619

(22) Filed: Aug. 2, 2017

(65) Prior Publication Data
US 2018/0337951 A1  Nov. 22, 2018

(30) Foreign Application Priority Data
May 19, 2017 (IN) .............................. 201741017728

(51) Int. Cl.
 *H04L 9/00* (2006.01)
 *G06F 21/00* (2013.01)
 *H04L 29/06* (2006.01)
 *H04L 9/32* (2006.01)
 *H04L 9/08* (2006.01)

(52) U.S. Cl.
 CPC .............. *H04L 63/20* (2013.01); *H04L 9/088* (2013.01); *H04L 9/3247* (2013.01); *H04L 9/3271* (2013.01); *H04L 63/0442* (2013.01); *H04L 63/08* (2013.01); *H04L 63/126* (2013.01)

(58) Field of Classification Search
CPC ....... H04L 63/20; H04L 9/3271; H04L 9/088; H04L 63/126; H04L 63/08; H04L 9/3247; H04L 63/0442
See application file for complete search history.

(56) References Cited

U.S. PATENT DOCUMENTS

| | | | |
|---|---|---|---|
| 2013/0262650 A1* | 10/2013 | Sutherland | H04L 41/00 709/223 |
| 2014/0020070 A1* | 1/2014 | Angal | G06F 21/44 726/5 |
| 2014/0156472 A1* | 6/2014 | Stuntebeck | G06Q 10/087 705/28 |
| 2016/0286394 A1* | 9/2016 | Iyer | H04W 4/021 |
| 2017/0374067 A1* | 12/2017 | Quintas | G06F 21/44 |

FOREIGN PATENT DOCUMENTS

EP  3567558 A1 *  11/2019  ............ H04W 12/08

OTHER PUBLICATIONS

Ankur Nagar; Lavanya Elluri; Karuna Pande Joshi; Automated Compliance of Mobile Wallet Payments for Cloud Services; 2021 7th IEEE Inti Conference on Big Data Security on Cloud, High Performance and Smart Computing, and Intelligent Data and Security; Conference Paper; Publisher: IEEE; pp. 38-45 (Year: 2021).*

* cited by examiner

*Primary Examiner* — Shewaye Gelagay
*Assistant Examiner* — Courtney D Fields
(74) *Attorney, Agent, or Firm* — Thomas | Horstemeyer, LLP

(57) ABSTRACT

Disclosed are various approaches for generating a management token corresponding to a client device. The management token can include one or more device policies that can be installed or enforce on a client device. This can allow a device that might not be enrolled as a managed device to be taken into a facility and comply with the security policies of the facility.

20 Claims, 7 Drawing Sheets

APPLYING DEVICE POLICIES USING A MANAGEMENT TOKEN

RELATED APPLICATIONS

Benefit is claimed under 35 U.S.C. 119(a)-(d) to Foreign Application Serial No. 201741017728 fifed in India entitled "APPLYING DEVICE POLICIES USING A MANAGEMENT TOKEN", on May 19, 2017, by VMware, Inc., which is herein incorporated in its entirety by reference for all purposes.

BACKGROUND

In today's environment, smartphones and other devices are becoming more and more ubiquitous and more essential to users, both for personal and enterprise uses. Many users prefer not to go any period of time without their devices in their possession. Client devices issued by an enterprise can be managed by a management service that provides the ability to remotely manage or administer devices that are enrolled with the management service as a managed device. For example, devices can be enrolled with a remotely executed management service using application programming interfaces (APIs) or other capabilities that are embedded within the operating system of the device. A management component can also be installed on a client device so the device can be locally managed by the management component and remotely managed by the management service.

Certain facilities, such as government facilities or sensitive corporate facilities, can impose policies that restrict what devices can be physically brought into the facility. For example, a government facility where highly classified or sensitive information is housed might restrict devices that have cameras from being brought into the facility. As another example, a facility might restrict devices having certain applications from being brought into a facility. To ensure enforcement of such policies, a facility might simply confiscate or hold the devices of visitors instead of allowing a visitor to keep his or her device while in the facility and permitting use of a framework that allows for electronic enforcement of security policies.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
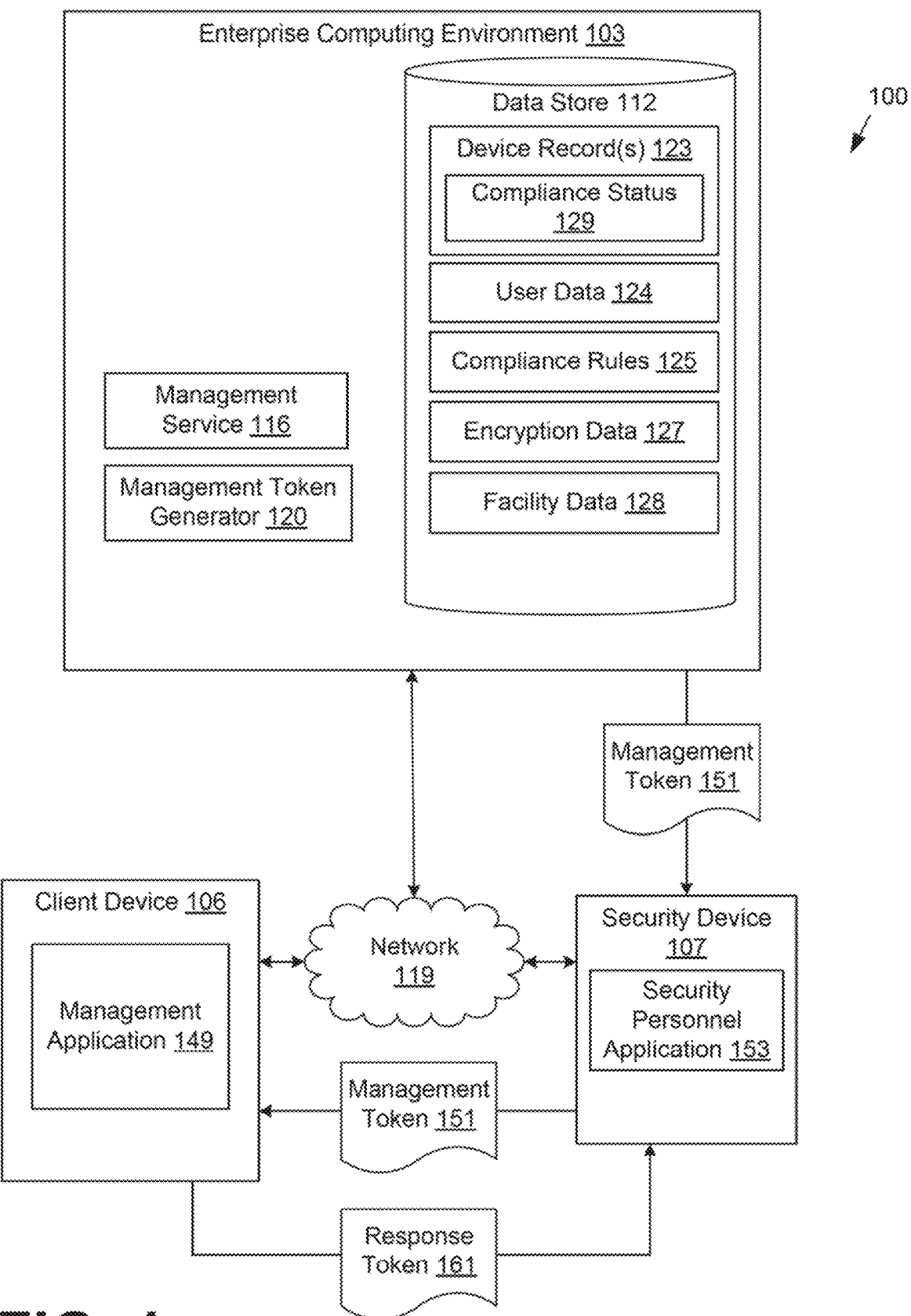
FIG. 1 is a schematic block diagram depicting an example implementation according to various examples of the disclosure.

Disclosed are examples of a system that allow compliance rules, device policies, or security policies to be enforced on a user's device without requiring the device to be enrolled as a managed device with a management service. In many corporate, government, or other types of facilities, computing devices such as smartphones, tablets, or other computing devices are often banned from entering the building. In many cases, these outright bans exist because security personnel cannot (or cannot easily) verify whether the devices of visitors comply with the policies that an organization owning or operating the facility has in place for security reasons. In one example, the enterprise owning or operating the facility might require that any device sensor capable of capturing confidential information be disabled for the device to be permitted to enter the facility. For instance, the facility might require that a camera and a microphone of the device be disabled. As another example, the facility might have rules in place that disallow certain applications from being installed or usable on a device for the device to enter the facility.

More particularly, the above described technical problem occurs in various scenarios. In one scenario, a user who has his or her personal device or a device that was not issued by an enterprise wishes to bring their client device into a facility owned or operated by the enterprise, such as when the employee is a contractor or visitor ("foreigner"). Security personnel, who are not likely to be information technology (IT) administrators of the enterprise, would generally not have a way to install or enforce management or security policies on the device. Consequently, a technical solution is needed to provide security personnel with a mechanism to facilitate enforcement of the enterprise's security or device policies so that the visitor is allowed to enter the facility and keep his or her device while also allowing the enterprise to enforce rules about the usage of his or her device while the user is in the facility. As the user is exiting the facility, the policies can be released or removed from the user's device by security personnel.

Accordingly, examples of the disclosure include systems and methods to send policies to the user's device, which are received and enforced on the user's device by a management application installed on the user's device. The policies can be sent to the user's device by way of a management token, which identifies the policies that must be applied on the user's device. In one scenario, the management token can be generated by a management token generator associated with the facility that the user is attempting to enter. The management token can identify one or more device policies that the management application can enforce on the user's device.

The management application on the user's device can provide a response token to a management token generator or another application executed on behalf of the facility, which can confirm that the device policies have been received and are being enforced on the user's device. Upon leaving the facility, the management token generator can also provide a release token to the management application. The release token can be authenticated by the management application, which can remove the device policies or cease enforcement of the device policies on the user's device. Additionally, the management application can be installed as a device administrator or with elevated privileges on the user's device. In this way, the management application can restrict its removal from the device while device policies are being enforced on the device. In some scenarios, the management application can permit its removal or uninstallation when device policies are not in effect or being enforced on a device.

A management token, a response token, or release token can be communicated with a client device and a management token generator by way of a barcode (e.g., quick response (QR) code, two-dimensional barcode, other representation of an alphanumeric number) on a display of a device associated with the facility or on a display of the user's device, or client device. The device associated with the facility, or a security device, and a client device use a camera or image capture device to capture the visual representation and thereby access the associated token. Alternatively, the devices can exchange tokens by transmitting it over a network (e.g., NFC, Bluetooth, Wi-Fi, or cellular).

FIG. 1 illustrates an example of a networked environment 100 according to examples of the disclosure. In the depicted network environment 100, an enterprise computing environment 103, at least one client device 106 and at least one security device 107 ("security device") can be connected to a network 119, such as the Internet.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, a management token generator 120, and other applications, services, processes, systems, engines, or functionality not discussed in detail herein. In some implementations, a management service 116 is an optional component.

The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116. The management service 116 can initiate installation of applications as managed applications. The management service 116 can also initiate installation of configuration profiles that can be accessed by certain applications installed on a client device 106.

The management service 116 can include a management console that can allow administrators to manage client devices 106 that are enrolled with the management service 116. User interfaces can allow an administrator to define policies for a user account or client devices 106 associated with an enterprise environment. The user interfaces can also include, for example, presentations of statistics or other information regarding the client devices 106 that can be managed by the management service 116.

The enterprise computing environment 103 can also execute a management token generator 120. The management token generator 120 can generate a management token 151 by communicating with the management service 116 or on its own. A management token 151 can include a representation of one or more compliance rules or device policies that comprise the security policies of an enterprise that an enterprise wishes to enforce on a client device 106. The management token 151 can be encrypted using a symmetric encryption key or using a public key for which the client device 106 has a corresponding private key. In another example, the management token 151 can be signed by a digital signature or certificate associated with the management token generator 120 so that the client device 106 can authenticate the sender or author of the management token 151.

The management token 151 can be represented by an alphanumeric encoding that can be encoded within a QR code or other data representation. In some examples, the management token 151 can be provided by the management token generator 120 directly to a client device 106 or to a security device 107 operated by security personnel to a facility, which can provide the management token 151 to the client device 106. In some implementations, the functionality of the management token generator 120 can be implemented on a security device 107 or another computing device accessible to security personnel associated with a facility. Once provided to a management application 149 installed on a client device 106, the management application 149 can apply or enforce the device policies on the client device 106 without requiring the device to enroll as a managed device with a management service 116 according to examples of this disclosure.

The data stored in the data store 112 can include device records 123, user data 124, compliance rules 125, encryption data 127, facility data 128 and potentially other data. Device records 123 can include data that corresponds to client devices 106 that are either enrolled as managed devices with the management service 116 or that are unenrolled devices to which a management token 151 has been issued by the management token generator 120. A device record 123 can include various security settings selected for enforcement on a client device 106 that might be enrolled with the management service 116. Accordingly, a device record 123 can include a device identifier associated with a device, such as the client device 106, one or more device certificates, a compliance status 129, and other data. In some examples, a device record 123 can also identify a user associated with a particular client device 106. The compliance status 129 can indicate whether a particular client device 106 is in compliance with one or more compliance rules 125 or device policies that are being enforced on the client device 106.

The device record 123 can also be data describing the identity, type and components of the client device 106; data describing the state of the client device 106; data describing organizational groups to which the client device 106 belongs; data describing compliance rules 125 with which the client device 106 must comply; data describing management policies that specify if, when and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 116), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). Certain data about a client device 106 can be obtained from the management application 149 through a response token that is issued to the security device 107 or directly to the management token generator 120, such as a device identifier, and the data obtained from the client device 106 in this way can be associated with a device record 123 of the client device 106. In some examples, the management application 149 can embed the compliance status 129 of the client device 106 with respect to the compliance rules 125 enforced on the client device within the response token as well.

In other examples, once the management application 149 receives a management token 151 and applies device policies on the client device 106, the management application 149 can make ongoing reports about the state of the client device 106 to a management service 116 until the device policies are released or removed from the client device. To this end, data in a device record 123 can also include, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 116 or management token generator 120, whether the client device 106 is in a state of compliance with any applicable compliance rules 125, and whether any remedial actions have been (or are to be) taken as a result of a noncompliance with any applicable compliance rules 125. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

In some implementations, the management service 116 or management token generator 120 can establish a command queue associated with the client device 106 within the device record 123 for devices on which a device policy has been applied. For example, the management service 116 can maintain a command queue of commands that are designated for execution against the client device 106. As described herein, a client device 106 can install or apply one or more compliance rules 125 or device policies provided by the management token generator 120. To this end, the management service 116 or management token generator 120 can store a command related to a compliance rule 125 in the command queue. Additionally, the management service 116 can store a command related to a remedial action associated with a compliance rule 125 in the command queue in the event that it is determined that a rule condition associated with the compliance rule 125 has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Compliance rules 125 can specify one or more device policies or security policies to which the client device 106 must adhere. Compliance rules 125 can be based on time, geographical location, or device and network properties. For instance, the client device 106 can satisfy a compliance rule 125 when the client device 106 is located within a particular geographic location. The client device 106 can satisfy a compliance rule 125 in other examples when the client device 106 is in communication with a particular local area network, such as a particular local area network that is managed by the computing environment 203. Furthermore, a compliance rule 125 in another example can be based upon the time and date matching specified values.

A compliance rule 125 can specify that a client device 106 is required to be powered off or be in a low power "sleep" state during a specified time period. Another compliance rule 125 can specify that a client device 106 is required to be powered on or be in a normal operation "awake" state during a specified time period. As another example, a compliance rule 125 can specify that a client device 106 is prohibited from rendering content that has been designated as confidential. A compliance rule 125 can also specify whether a camera associated with the client device 106 must be enabled or disabled. The compliance rule 125 can also specify certain times of the day, week, or year in which certain hardware or software features are permitted to be enabled or disabled.

Another example of a compliance rule 125 involves whether a user belongs to a particular user group. For instance, a compliance rule 125 can include a whitelist or a blacklist that specifies whether particular users or groups of users are authorized to perform various functionalities, such as installing or executing a particular application.

Other examples of compliance rules 125 include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule 125 can specify that the client device 106 is required to authenticate a user using a password or personal identification number (PIN) in order to unlock the client device 106.

A compliance rule 125 can also require that the client device 106 have device encryption enabled, where data stored on the device is stored in an encrypted form. The data can be encrypted by a device certificate. A compliance rule 125 can also require that the client device 106 be enrolled with the management service 116 as a managed device. Another compliance rule 125 can specify that the user is required to accept the terms of service that are presented by the management component 145 on the client device 106. As another example, a compliance rule 125 can specify that the management component 145 is required to periodically communicate or "check-in" with the management service 116 to report on its status. If a threshold amount of time has elapsed since the previous check-in of the client device 106, the client device 106 can be considered to have violated this compliance rule 125.

Another compliance rule 125 can specify that a client device 106 run one of a specified variants or versions of a particular operating system. A compliance rule 125 can also specify that an enrolled device be manufactured by a particular manufacturer or have a particular manufacturer identifier. Another compliance rule 125 can specify that an enrolled device be a particular model name or model number. A client device 106 can also be considered out of compliance if the device is in a data roaming mode or has used a threshold amount of a periodic network data usage allowance.

A compliance rule 125 can also identify a list of required applications that must be installed on the client device 106 or a list of forbidden applications that cannot be installed on the client device 106. The management application 149 can remove or disable a forbidden application or install a missing required on application on the client device 106 in response to detecting a violation of such a compliance rule 125. A compliance rule 125 can also require the presence of a mobile device management (MDM) profile, an MDM storage area, an application profile, and/or a configuration profile. The management application 149 can obtain and store missing required data or containers on the client device 106 in response to detecting a violation of such a compliance rule 125.

Therefore, the compliance status 129 indicates whether and to what extent a particular client device 106 is compliant with compliance rules 125 enforced on the client device 106 by the management application 149. The compliance status 129 can be determined by the management application 149 on the client device 106 that analyzes the status of the client device 106 and reports compliance to the management service 116 or management token generator 120. In other examples, the compliance status 129 can be determined by the management service 116 or management token generator 120 based upon state information describing the client device 106, which can be reported by the management application 149. The compliance status 129 can also include the state of various hardware or software features of the client device 106 without respect to whether the status of the features are determined by a compliance rule 125.

User data 124 contains information about users who are associated with client devices 106 that might be enrolled with the management service 116. User data 124 can include profile information about a user, authentication information about a user, applications that are installed on client devices 106 associated with the user, and other user information. For example, user data 124 can include information about client devices 106 that are associated with a user account of the user, enterprise resources to which a particular user has access, such as email, calendar data, documents, media, applications, network sites, or other resources. The user data 124 can also identify one or more user groups of which a particular user is a member, which can in turn define the access rights of the user to one or more enterprise resources as well as identify which applications should be deployed to a client device 106 associated with the user. To this end, the user data 124 can further identify one or more device identifiers that can uniquely identify client devices 106 that are associated with a riser account of the user.

The encryption data 127 can represent one or more sets of encryption keys that are associated with the enterprise computing environment 103. The encryption data 127 can include a private key or symmetric key that is used to encrypt a management token 151 issued to a client device 106. The encryption data 127 can also include a public key that might correspond to a private key. The encryption data 127 can also include data associated with a digital signature or digital certificate and with which a management token 151 or release token issued to a client device 106 can be signed so that the management application 149 can verify their respective senders. For example, a hash algorithm, private key, public key, certificate, certificate authority data, or data associated with a digital signature or signing system can be stored in encryption data 127.

Facility data 128 can include information about a particular facility associated with a security device 107. In one examples, a security device 107 or a management console can be associated with a particular facility that has a first set of rules regarding device policies that must be enforced on a client device 106, and a second facility might have different device policies that must be enforced on a client device 106. Facility data 128 can store an indication of which rules should be enforced on a client device 106 as a condition for entering the facility. The facility data 128 can also identify a facility identifier that uniquely identifies a particular identifier with respect to other facilities.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106 can be enrolled with the management service 116 as a managed device of an enterprise.

The client device 106 can execute a management application 149 that can communicate with a security device 107 or management token generator 120 to facilitate enforcement of device policies on the client device 106. The management application 149, in some implementations, can communicate with the management service 116 to enforce device policies, management policies, or compliance rules on the client device 106 that are obtained from the security device 107 or management token generator 120 in a management token 151.

For example, the management application 149 can install or enforce security policies, enforce data security requirements, install, remove or update security certificates, or write, modify or delete certain data from the client device 106. The management application 149 can also monitor the client device 106, generate state information describing the client device 106, and provide the management service 116 with such state information. For example, the state information can include the network activity of the client device 106, the location of the client device 106, whether enforce password or personal identification number (PIN) authentication is enforced, and/or whether other compliance rules 125 are being complied with by the client device 106.

For example, the management application 149 can enforce a requirement that a device camera be disabled while the client device 106 is within a facility or while the device policies are being enforced on the device. As another example, the management application 149 can disable certain applications that are not permitted within the facility or certain functionality of certain applications that is not permitted within the facility. As another example, the management application 149 can disable certain hardware features or functionalities of the device, such as the Wi-Fi or Bluetooth radios of the device, an external memory card reader of the device, or other hardware features that an operator of a facility might wish to restrict while in the facility.

To carry out local management of a client device 106, the management application 149 can be installed and executed with elevated or administrative privileges on the client device 106. In some scenarios, the operating system of the client device 106 can allow a particular application or package to be identified as a device owner or a device administrator, which can in turn configure the client device 106 using such privileges.

Accordingly, to implement embodiments of the disclosure, a user of the client device 106 must install or allow to be installed on the device a management application 149 that has the authority or ability to enforce device policies. Accordingly, the management application 149 can be obtained from an application repository, such as a publicly accessible application marketplace. In some examples, the management application 149 can be obtained or downloaded directly from the security device 107 or the management token generator 120.

The management token 151 can represent a data structure that identities compliance rules 125 or other information about a client device 106, such as its operating system, hardware features, software features, whether certain hardware features are enabled, disabled, or restricted from being enabled or disabled by the management application 149. The data structure can be encoded into a QR code or other digital or visual representation that the management application 149 can obtain from the management token generator 120.

The management token 151 can also be configured to expire. The management token generator 120 can embed a timestamp at which time the management token 151 is deemed to expire. The management token generator 120 can also embed a timestamp representing when the management token 151 was generated as well as a lifespan of the management token 151, after which the management token 151 is deemed to have expired.

The device posture token 151 can also be configured to include a credential and/or a network-driven API command associated with the management service 116. As described above, the security device 107 can use the credential to authenticate to the management service 116. This may be required, as without such credential, a security device 107 is unlikely to be permitted to communicate with a management service 116 that comprises a foreign management service. Once authenticated (if required by the management service 116), the network-driven API command can be used by the security device 107 to cause the management service 116 to provide the security device 107 with one or more of compliance rules 125, state information describing the client device 106, and an indication of whether the client device 106 complies with such compliance rules 125.

The security device 107 represents a computing device, such as a barcode scanning device, a smartphone, or a personal computer. The security device 107 can be coupled to a camera, a barcode scanner, a near-field communication interface, or any other communications interface. The security device 107 can also be configured with a network communications interface to facilitate communications over the network 119. However, it is not essential for the security device 107 to have a network communications interface. The security device 107 can execute a security personnel application 153. The security personnel application 153 can obtain a management token 151 from the management token generator 120 and provide the management token 151 to the management application 149. For example, the security personnel application 153 can obtain a management token 151 containing the various device policies that a facility requires to be enforced on a device.

The management token 151 can be presented as an alphanumeric value embedded within a QR code displayed on a display of the security device 107, which is captured by the management application 149 using a camera of the client device 106. The management application 149 can authenticate the management token 151 by verifying a digital signature of the management token 151 or decrypting the token using a pre-shared encryption key accessible to the management application 149. The management application 149 can then extract the extract the device policies embedded within the management token 151 and install or enforce them on the client device 106.

The management application 149 can provide a response token 161 to the security personnel application 153 that confirms that the device policies have been installed or enforced on the client device 106. The response token 161 can include a device identifier, such as a UDID, IMEI, or other identifier associated with the client device along with a confirmation or compliance status with respect to the device policies included within the management token 151. The response token 161 can be encrypted using a public key associated with the management token generator 120. The security personnel application 153 can provide the response token 161 to the management token generator 120, which can decrypt the token if encrypted and extract the data embedded in the response token 161. The data can be associated with a device record 123 corresponding to the device and validated by the management token generator 120. If the management token generator 120 determines that the management application 149 has successfully applied or enforced all of the device policies provided in the management token 151, the management token generator 120 can provide an indication to the security personnel application 153. The security personnel application 153 can then render a notification that the client device 106 is permitted to enter the facility or that it has complied with the directives in the management token 151.

If a user is leaving the facility, the security personnel application 153 can also request a release token from the management token generator 120. The release token can authorize the management application 149 to remove or release the client device 106 from the device policies installed or enforced on the client device 106. The release token can be signed by a digital signature that can be verified by the management application 149 or encrypted using a particular encryption key so that a user cannot easily generate their own release token or spoof the release token in any way.

Figure 2:
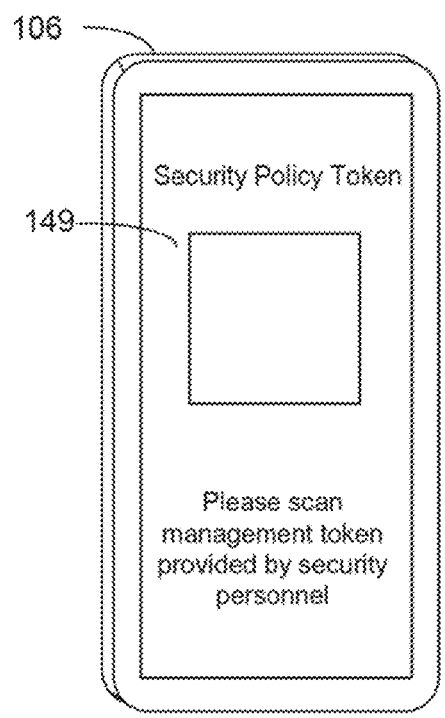
FIGS. 2-3 are examples of the management application according to examples of the disclosure.

Referring next to FIG. 2, shown is an example of how the management application 149 can obtain a management token 151 from the security device 107. In one scenario, upon entering a secure facility, security personnel can request that the user install the management application 149 or provide the management application 149 for installation on the client device 106 assuming that the user has not already installed it.

Next, as shown in FIG. 2, the user can be requested to scan the management token 151 that is presented on the security device 107. The management token 151 can be generated or obtained by the security device 107 from the management token generator 120. In one scenario, a user of a computing device may enter a facility that may have security policies governing whether mobile devices, tablets, or computers can be brought into the facility and what capabilities or compliance status of devices such devices must have to be permitted within the facility. Accordingly, to facilitate allowing users or guests to bring their devices into a facility or through a security checkpoint, security personnel can present a management token 151 to the user's device that contains one or more device policies that are enforced on the user's device by the management application 149. The management token generator 120 can generate the management token 151 in response to a request from the security device 107 and associate a device record 123 with the request.

Figure 3:
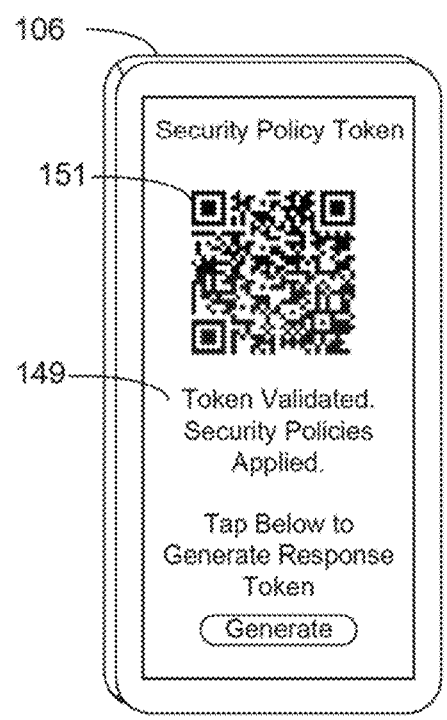

Referring next to FIG. 3, in the depicted scenario, the management application 149 has obtained a management token 151 from the security device 107 and has displayed a representation of the management token 151 on the display of the security device 107. The management token 151 can be obtained as an encrypted and/or signed alphanumeric string or numeric value. The management token 151 can be displayed by the security device 107 in a QR code or another barcode that can be visually encoded. In some examples, the management token 151 can be transmitted to a security device 107 over NFC, Wi-Fi, Bluetooth, or other network protocols and standards. In some examples, the management token 151 also expires, and the management application 149 can display a countdown time that indicates to the user when the management token 151 will expire. In one scenario, the security device 107 can point the management application 149 to a uniform resource locator (URL) on the internet from which the management application 149 can retrieve the management token 151.

The management application 149 can validate the management token 151 and apply or enforce any device policies that are embedded in or referenced by the management token 151. For instance, the management token 151 can be encrypted by the management token generator 120 using an encryption key that has been pre-shared between the management token generator 120 and the management application 149. The management application 149 can then decrypt the management token 151 and extract the device policies that are identified within the management token 151. In some instances, the management token 151 can include a verification value that the management application 149 can use to confirm the authenticity of the management token 151. The management token 151 can also include a facility identifier that identifies the facility for which the management token 151 was generated.

In other instances, the management token 151 can be signed using a digital signature. In this scenario, the management token 151 can verify the sender of the management token 151 using a public key that is based on the digital signature used to sign the management token 151 and that is embedded within the management token 151. In these various way, the management application 149 can verify the sender of the management token 151 to confirm that it is authentic. In some examples, the management token 151 can include a public key that it can use to encrypt a response token that is sent back to the security device 107. The corresponding private key can be held by the management token generator 120 so that only the management token generator 120 can decrypt the response token. In some examples, the response token can be signed with a digital signature for which a corresponding public key is embedded in the response token.

Through the response token, the security device 107 and/or the management token generator 120 can verify that the management application 149 has received the management token 151 and applied the device policies that are required to be enforced by the facility. The response token 161 can include a compliance status with respect to the various device policies that were embedded in the management token 151. The response token 161 can also include device identifying information, such as a UUID, that can be associated with the device record 123.

Figure 4:
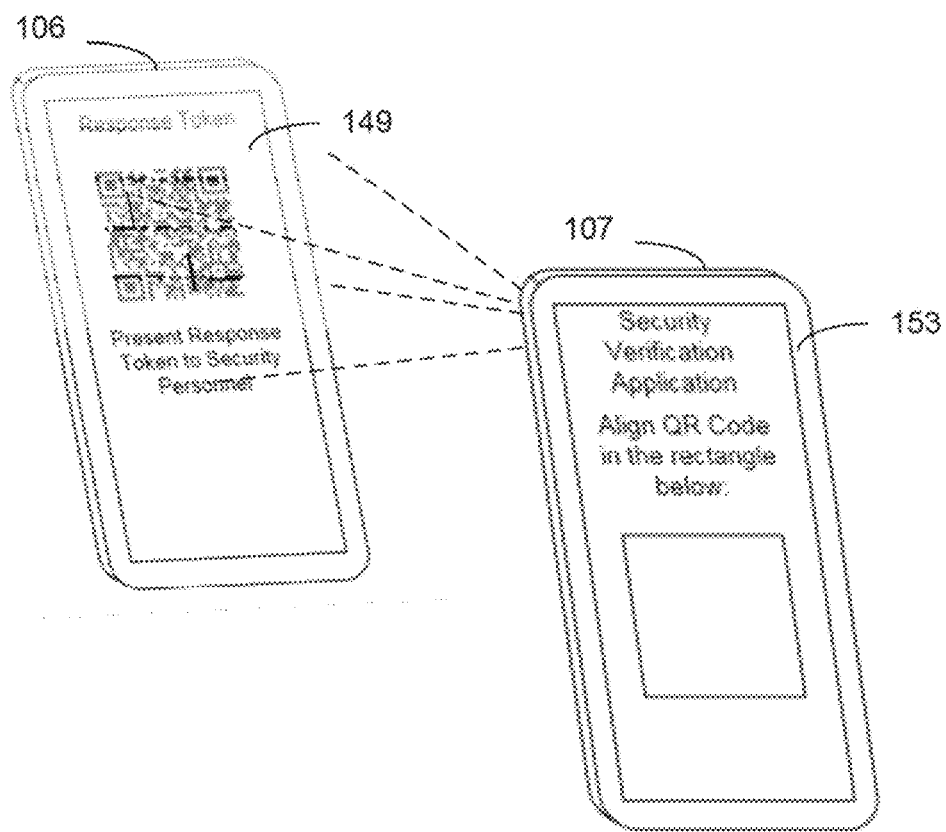
FIGS. 4-5 are examples of the management application and security device according to examples of the disclosure.

Referring next to FIG. 4, shown is an illustration of the security personnel application 153 executed by the security device 107 obtaining the response token 161 generated by the management application 149 from the client device 106. In this scenario, the security device 107 can be operated by security personnel associated with a particular facility. The security personnel application 153 can instruct the security personnel how to obtain the response token 161 from the client device 106 of a user, such as by providing instructions through a user interface displayed by the security device 107. In the depicted example, the response token 161 is obtained by capturing the QR code using a camera or barcode scanner integrated within or in communication with the security device 107. In some examples, the response token 161 can be obtained by the security personnel application 153 through an NFC session, a Bluetooth communication session, or any other network protocol or standard.

Figure 5:
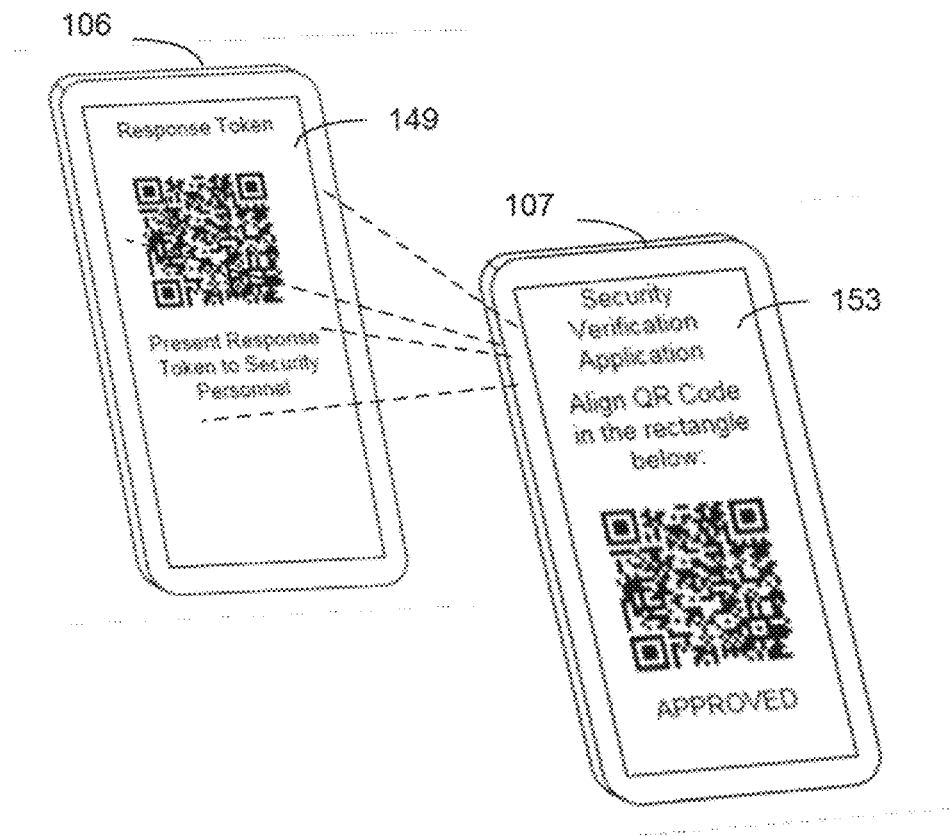

Referring next to FIG. 5, shown is an illustration of the response token 161 being obtained and validated by the security personnel application 153 of the security device 107. As shown in FIG. 5, once the response token 161 is obtained, the security personnel application 153 can verify that the response token 161 is authentic and determine that the client device 106 complies with the security policies of a particular facility based at least in part on the information embedded within the response token 161. In some examples, the response token 161 can be provided to the management token generator 120, which can validate the response token 161 and provide an indication to the security personnel application 153 whether the response token 161 was validated (e.g., "approved" or "denied"). If the response token 161 was validated, the security personnel can allow the user to enter the facility with the client device 106.

Figure 6:
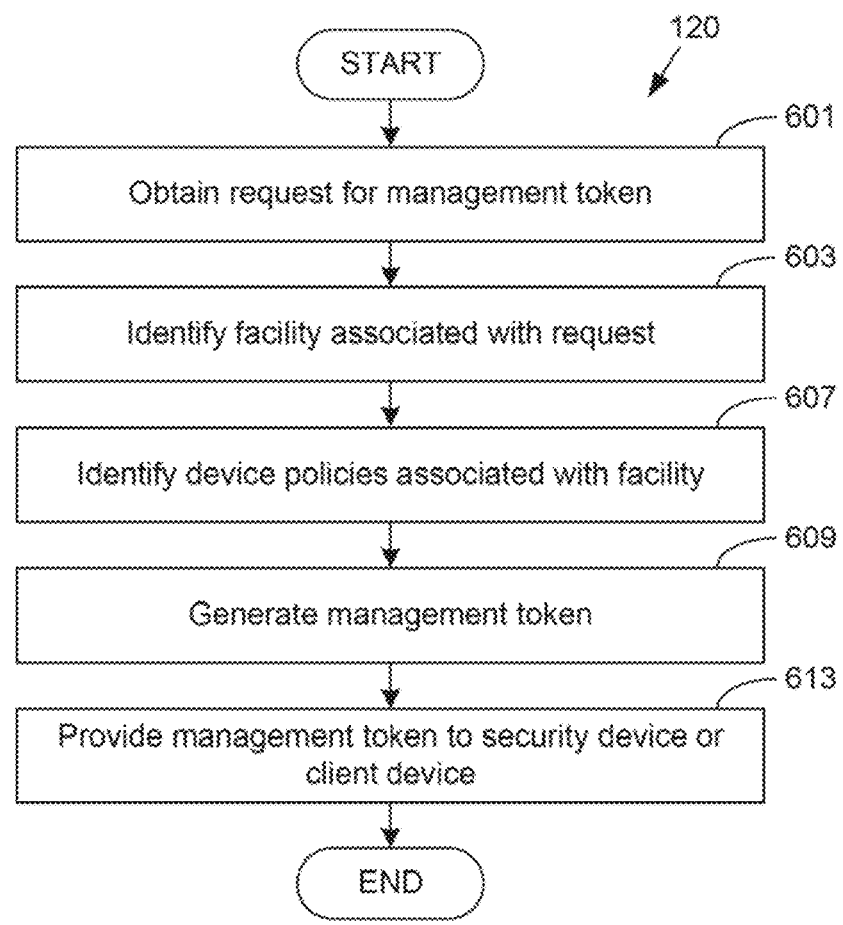
FIGS. 6-8 are flowcharts that illustrate functionality according to examples of the disclosure.

Referring to FIG. 6, shown is a flowchart that provides one example of how the management token generator 120 can generate a management token 151 for a client device 106. In various examples, the management token generator 120 can be executed by the enterprise computing environment 103, the security device 107, or the management service 116.

Beginning at step 601, the management token generator 120 can obtain a request for a management token 151 for a client device 106. The request can be generated by a security device 107 operated by security personnel in a particular facility. The request can identify the facility associated with the request so that the management token generator 120 can identify the appropriate device policies or compliance rules 125 that should be included in or referenced by management token 151.

At step 603, the management token generator 120 can identify the facility associated with the request. The facility can be referenced in the request by a facility identifier or another identifier that uniquely identifies the extract the device identifier from the request.

At step 607, the management token generator 120 can identify the device policies that are associated with the facility. In one example, the management token generator 120 can identify which compliance rules 125 are referenced by the facility data 128 associated with the facility identified in the request for the management token 151.

At step 609, the management token generator 120 can generate the management token 151. The management token 151 can be encrypted using a pre-shared encryption key that has been shared to or provided to the management application 149 that will enforce or apply the device policies on the client device 106. In some examples, the management token 151 can be signed using a digital signature or certificate associated with the management token generator 120 so that the management application 149 can verify the authenticity or sender of the management token 151. The management token 151 can identify the device policies by referencing a policy identifier that the management application 149 can recognize. In other embodiments, the policies or compliance rules 125 can be embedded within the management token 151.

At step 613, the management token 151 can be provided to the security device 107, which can provide the management token 151 in a QR code. In some scenarios, the management token generator 120 can make the management token 151 available at a server URL and provide the URL to the security device 107, which can embed the URL in a QR code that is provided to the management application 149. In some examples, the management token 151 can be provided directly to the client device 106 from the management token generator 120. Thereafter, the process proceeds to completion.

Figure 7:
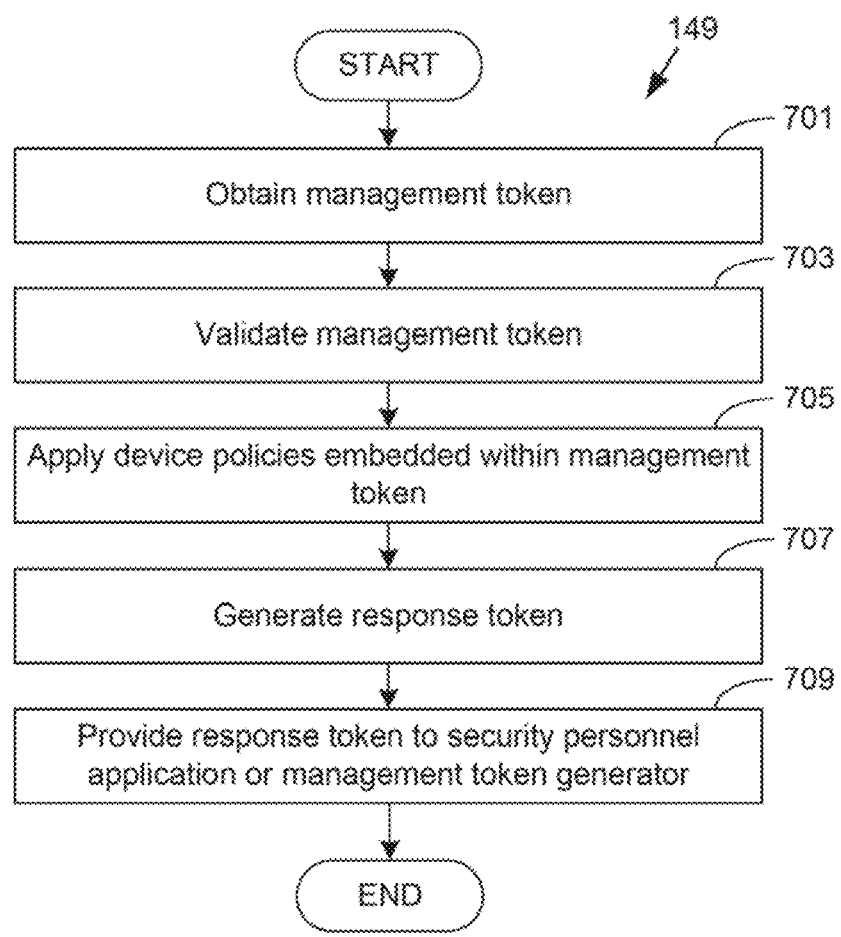

Referring next to FIG. 7, shown is a flowchart that provides one example of how the management application 149 can obtain a management token 151 and provide a corresponding response token 161.

Beginning at step 701, the management application 149 can obtain a management token 151 from the security device 107 or the management token generator 120. The management token 151 can be obtained by scanning a QR code on a display of the security device 107, through NFC communication, or other local or wide area network communication. The management token 151 can also be obtained by retrieving the management token 151 from a URL provided by the management token generator 120.

At step 703, the management application 149 can validate the management token 151 obtained at step 701. The management application 149 can validate the management token 151 by decrypting the management token 151 using an encryption key with which the management token 151 was encrypted. The management token 151 can also be validated by verifying that a digital signature used to sign the management token 151 corresponds to the management token generator 120. The management token 151 can also be validated by verifying a verification value embedded within the management token 151.

Next, at step 705, the management application 149 can extract device policies from the management token 151 and apply or install them on the client device 106. The device policies can include restrictions on hardware capabilities of the client device 106, such as disabling or impairing a camera, networking capability, memory card reader, or other capability of the device. The device policies can also include a requirement that certain applications be disabled or removed from the client device 106. The applications can be identified by a bundle identifier or other identifier that uniquely identifies the applications. The device policies can further include a restriction of certain capabilities of certain applications installed on the client device 106.

Next, at step 707, after applying the device policies on the client device 106 at step 705, the management application 149 can generate a response token 161 that can be sent to the security device 107 or management token generator 120. The response token 161 can be generated by including a device identifier within the token. The response token 161 can also include an enforcement status of the device policies that were in the management token 153. The response token 161 can also be encrypted with a public key of the management token generator 120 or a signed with a digital signature of the client device 106.

At step 709, the management application 149 can provide the response token 161 to the security personnel application 153 or the management token generator 120. The response token 161 can be validated by the management token generator 120 or security personnel application 153 so that an indication of whether the client device is in compliance with the device policies that were in the management token 151 can be generated or displayed by the security device 107. Thereafter, the process proceeds to completion.

Figure 8:
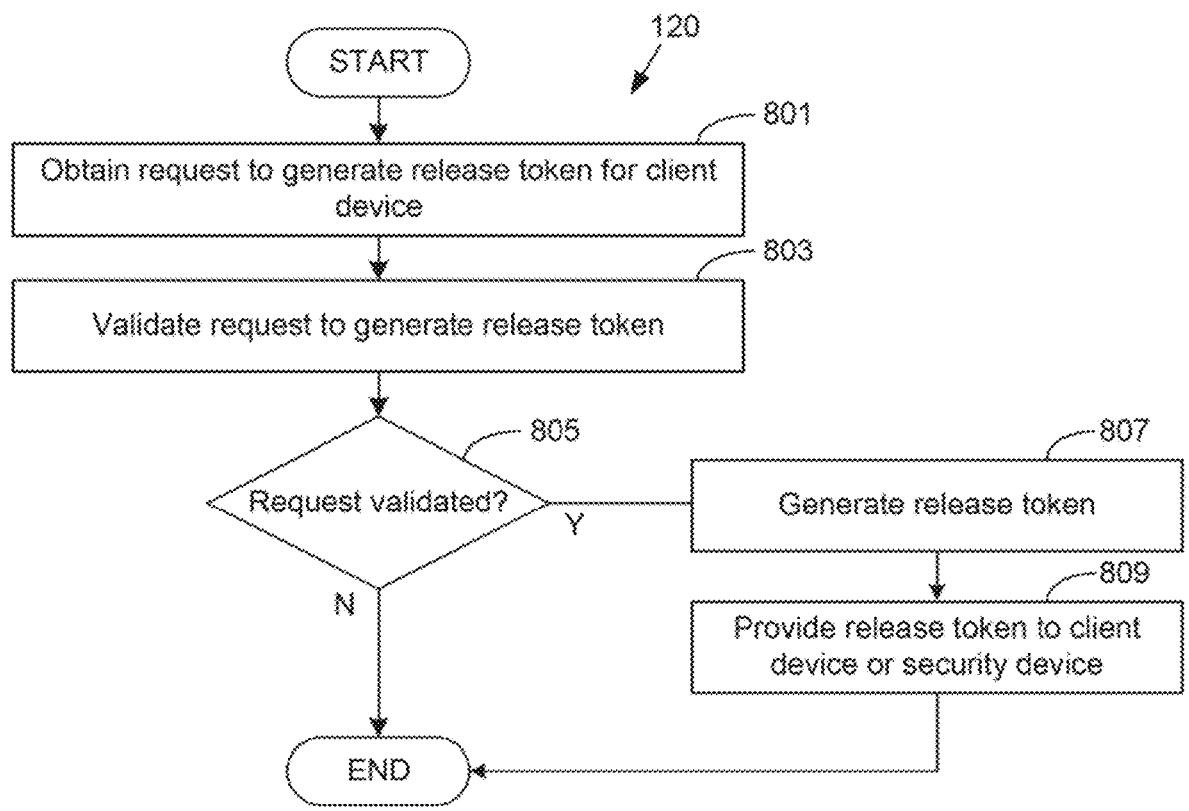

FIG. 8 depicts a flowchart illustrating how the management token generator 120 can generate a release token that releases the client device 106 from the device policies enforced by the management application 149. First, at step 801, the management token generator 120 can obtain a request to generate a release token for a client device 106. In one example, the security personnel application 153 can obtain the response token 161 from the display of the client device 106. The response token 161 can be the same token that was previously provided to the security device 107 when the management token was first issued to the client device 106. In another example, a release request token can be generated by the management application 149 and provided to the security device 107. The release request token can include the device identifier of the client device 106. The release request token can be encrypted by a public key of the management token generator 120 or signed by a digital signature of the management application 149 so that the management token generator 120 can validate the sender of the release request token.

At step 801, the management token generator 120 can also validate that the device providing the release request is a security device 107. The management token generator 120 can validate the security device 107 based upon a digital signature or another device verification mechanism.

At step 803, the management token generator 120 can validate the release request. As noted above, the management token generator 120 can validate the request by validating a release request token generated by the client device 106 and/or by validating the security device 107 providing the request.

From step 805, if the release request cannot be validated, the process proceeds to completion. If the release request is validated at step 805, the process proceeds to step 807, where the management token generator 120 generates a release token. The release token can be signed by a digital signature of the client device 106 or encrypted using an encryption key accessible to the management token generator 120 so that the management application 149 can validate the release token before releasing or removing the device policies from the client device 106.

At step 809, the management token generator 120 can provide the release token to the security device 107 or directly to the client device 106. The release token can be provided to the security device 107 and displayed on a display device. The release token can be provide to the client device 106 from the security device 107 in the same way as a management token 151.

The flowcharts of FIGS. 6-8 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical functions).

Although the flowcharts of FIGS. 6-8 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, enterprise computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management token generator 120, management application 149, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

What is claimed is:

1. A system for applying a device policy onto a client device, comprising:
    at least one computing device comprising a processor and a memory; and
    a management token generator executed by the at least one computing device, the management token generator causing the at least one computing device to at least:
        obtain a request to generate a management token for the client device, the request comprising a facility identifier that identifies premises associated with an enterprise;
        generate a device record corresponding to the client device in a data store accessible to the management token generator;
        identify at least one device policy for enforcement on the client device based at least in part on the facility identifier;
        embed an indication of the at least one device policy within the management token;
        encrypt the management token;
        provide the management token for transmission to the client device;
        obtain a response token from the client device, the response token comprising a compliance status associated with the client device with respect to the at least one device policy;
        extract identifying information associated with the client device from the response token;
        associate the identifying information with the device record; and
        in response to determining that the client device is in compliance with the at least one device policy based at least in part on the compliance status, provide to a security device an indication that the client device is in compliance with the at least one device policy.

2. The system of claim 1, wherein the management token is encrypted with a symmetric key and the symmetric key is accessible to a management application executed by the client device.

3. The system of claim 1, wherein the management token is signed with a digital signature generated based upon data embedded within the management token, wherein the client device can authenticate an identity of a sender of the management token using a public key based upon the digital signature.

4. The system of claim 1, wherein the management token generator further causes the at least one computing device to at least:
  obtain a request to release the client device from the at least one device policy;
  generate a removal token authorizing removal of the at least one device policy from the client device; and
  provide the removal token to the client device, wherein the client device is configured to authenticate a sender of the removal token prior to removing the at least one device policy from the client device.

5. The system of claim 1, wherein the response token further comprises a user identifier associated with the client device.

6. The system of claim 1, wherein the response token is encrypted using a public key associated with the management token generator.

7. The system of claim 1, wherein the management token is provided to a management application installed on the client device, the management application being configured as a device administrator on the client device.

8. A method for applying a device policy on a client device, comprising:
  obtaining a request to generate a management token for the client device, the request including a facility identifier that identifies premises associated with an enterprise;
  generating a device record corresponding to the client device in a data store accessible to a management token generator;
  identifying at least one device policy for enforcement on the client device based at least in part on the facility identifier;
  embedding an indication of the at least one device policy within the management token;
  encrypting the management token;
  providing the management token for transmission to the client device;
  obtaining a response token from the client device, the response token comprising a compliance status associated with the client device with respect to the at least one device policy;
  extracting identifying information associated with the client device from the response token;
  associating the identifying information with the device record; and
  in response to determining that the client device is in compliance with the at least one device policy based at least in part on the compliance status, provide to a security device an indication that the client device is in compliance with the at least one device policy.

9. The method of claim 8, wherein the management token is encrypted with a symmetric key and the symmetric key is accessible to a management application executed by the client device.

10. The method of claim 8, wherein the management token is signed with a digital signature generated based upon data embedded within the management token, wherein the client device can authenticate an identity of a sender of the management token using a public key based upon the digital signature.

11. The method of claim 8, further comprising:
  obtaining a request to release the client device from the at least one device policy;
  generating a removal token authorizing removal of the at least one device policy from the client device; and
  providing the removal token to the client device, wherein the client device is configured to authenticate a sender of the removal token prior to removing the at least one device policy from the client device.

12. The method of claim 8, wherein the response token further comprises a user identifier associated with the client device.

13. The method of claim 8, wherein the response token is encrypted using a public key.

14. The method of claim 8, wherein the management token is provided to a management application installed on the client device, the management application being configured as a device administrator on the client device.

15. A non-transitory computer-readable medium comprising machine-readable instructions for generating a device posture token, wherein when executed by a processor of at least one computing device, the machine-readable instructions cause the at least one computing device to at least:
  obtain a request to generate a management token for a client device, the request including a facility identifier that identifies premises associated with an enterprise;
  generate a device record corresponding to the client device in a data store accessible to a management token generator;
  identify at least one device policy for enforcement on the client device based at least in part on the facility identifier;
  embed an indication of the at least one device policy within the management token;
  encrypt the management token;
  provide the management token for transmission to the client device;
  obtain a response token from the client device, the response token comprising a compliance status associated with the client device with respect to the at least one device policy;
  extract identifying information associated with the client device from the response token;
  associate the identifying information with the device record; and
  in response to determining that the client device is in compliance with the at least one device policy based at least in part on the compliance status, provide to a security device an indication that the client device is in compliance with the at least one device policy.

16. The non-transitory computer-readable medium of claim 15, wherein the management token is encrypted with a symmetric key and the symmetric key is accessible to a management application executed by the client device.

17. The non-transitory computer-readable medium of claim 15, wherein the management token is signed with a digital signature generated based upon data embedded within the management token, wherein the client device can authenticate an identity of a of the management token using a public key based upon the digital signature.

18. The non-transitory computer-readable medium of claim 15, wherein the response token further comprises a user identifier associated with the client device.

19. The non-transitory computer-readable medium of claim 15, wherein the response token is encrypted using a public key.

20. The non-transitory computer-readable medium of claim 15, wherein the management token is provided to a management application installed on the client device, the management application being configured as a device administrator on the client device.

\* \* \* \* \*